(12) United States Patent
Wang et al.

(10) Patent No.: US 11,554,405 B2
(45) Date of Patent: Jan. 17, 2023

(54) METHOD FOR PREPARING MODULAR PLANAR INTERCONNECT PLATE

(71) Applicants: National Taipei University of Technology, Taipei (TW); CeramEnergy Technology Co., Ltd., Taoyuan (TW)

(72) Inventors: Sea-Fue Wang, Taipei (TW); Fan-Ping Chen, Taoyuan (TW); Hsi-Chuan Lu, Taipei (TW)

(73) Assignees: NATIONAL TAIPEI UNIVERSITY OF TECHNOLOGY, Taipei (TW); CERAMENERGY TECHNOLOGY CO., LTD., Taoyuan (TW)

( * ) Notice: Subject to any disclaimer, the term of this patent is extended or adjusted under 35 U.S.C. 154(b) by 210 days.

(21) Appl. No.: 17/105,864

(22) Filed: Nov. 27, 2020

(65) Prior Publication Data

US 2022/0152683 A1    May 19, 2022

(30) Foreign Application Priority Data

Nov. 19, 2020  (TW) .................................. 109140565

(51) Int. Cl.
    *B21D 28/26*     (2006.01)
    *H01M 8/0254*    (2016.01)
(52) U.S. Cl.
    CPC .......... *B21D 28/26* (2013.01); *H01M 8/0254* (2013.01)
(58) Field of Classification Search
    CPC ........ B21D 13/02; B21D 22/02; B21D 22/04; B21D 28/26; B21D 53/04; B21D 35/001; H01M 8/0254
    See application file for complete search history.

(56) References Cited

U.S. PATENT DOCUMENTS

| | | | | |
|---|---|---|---|---|
| 3,589,942 A * | 6/1971 | Leitz, Jr. et al. | ... | H01M 8/2418 429/518 |
| 8,663,863 B2 * | 3/2014 | Erikstrup | ............ | H01M 8/0276 429/535 |
| 9,005,835 B2 * | 4/2015 | Blanchet | ............... | H01M 8/023 429/479 |
| 9,979,031 B2 * | 5/2018 | Lavenu | ............... | H01M 8/2483 |
| 2005/0217333 A1 * | 10/2005 | Daehn | .................... | B21D 26/14 72/56 |

(Continued)

FOREIGN PATENT DOCUMENTS

| | | |
|---|---|---|
| CN | 104900894 B | 2/2018 |
| CN | 107078315 B | 6/2019 |

*Primary Examiner* — Edward T Tolan
(74) *Attorney, Agent, or Firm* — Birch, Stewart, Kolasch & Birch, LLP

(57) ABSTRACT

A method for preparing a modular planar interconnect plate includes steps of a) providing a metal blank sheet having a main region and two first lateral regions, b) forming two openings respectively in the first lateral regions, and c) stamping to form protrusions and depressions at the main region on lower and upper surfaces of the metal blank sheet. In the stamping step, each of two lower surrounding protrusions and two upper surrounding depressions is formed to surround a corresponding one of the openings, and each of an upper surrounding protrusion and a lower surrounding depression is formed to surround the first lateral regions and the corresponding ones of the protrusions and depressions formed at the main region.

12 Claims, 7 Drawing Sheets

(56) References Cited

U.S. PATENT DOCUMENTS

2015/0311539 A1* 10/2015 Brandt ............... H01M 8/1018
429/514
2019/0221867 A1* 7/2019 Gambini ............. H01M 8/0254

* cited by examiner

METHOD FOR PREPARING MODULAR PLANAR INTERCONNECT PLATE

CROSS-REFERENCE TO RELATED APPLICATION

This application claims priority of Taiwanese Invention Patent Application No. 109140565, filed on Nov. 19, 2020.

FIELD

The disclosure relates to a method for preparing a modular planar interconnect plate, and more particularly to a method for preparing a modular planar interconnect plate which is used for a solid oxide fuel cell.

BACKGROUND

The present inventors have previously proposed, in US 2020/0266455 A1, a method for preparing a modular planar interconnect plate for a solid oxide fuel cell, which includes the steps of: (a) providing a metal blank sheet, (b) stamping a main region of the metal blank sheet to form a plurality of columns of upper protrusions on an upper surface of the main region of the metal blank sheet and a plurality of columns of lower depressions on a lower surface of the main region of the metal blank sheet, and (c) stamping the main region of the metal blank sheet to form a plurality of rows of lower protrusions on a lower surface of the main region of the metal blank sheet and a plurality of rows of upper depressions on the upper surface of the main region of the metal blank sheet.

SUMMARY

An object of the disclosure is to provide a novel method for preparing a modular planar interconnect plate which may be used in a solid oxide fuel cell.

According to the disclosure, a method for preparing a modular planar interconnect plate is used for a solid oxide fuel cell, and is formed with a plurality of upper main channels and a plurality of lower main channels. The upper main channels extend in a longitudinal direction and are displaced from each other in a transverse direction relative to the longitudinal direction. The lower main channels extend in the transverse direction and are displaced from each other in the longitudinal direction. The method includes the steps of:
a) providing a metal blank sheet having
a main region,
a circumferential region surrounding the main region, and
two first lateral regions spaced apart from each other in the longitudinal direction, and disposed respectively at left and right sides of the circumferential region;
b) forming two openings respectively in the first lateral regions;
c) stamping the metal blank sheet to form
a plurality of columns of lower protrusions at the main region on a lower surface of the metal blank sheet, the columns of the lower protrusions being displaced from each other in the longitudinal direction such that two adjacent ones of the columns of the lower protrusions define in-between a corresponding one of the lower main channels, each of the columns of the lower protrusions including a plurality of the lower protrusions which are displaced from each other in the transverse direction,
a plurality of columns of upper depressions at the main region on an upper surface of the metal blank sheet, the columns of the upper depressions being displaced from each other in the longitudinal direction, each of the columns of the upper depressions including a plurality of the upper depressions which are displaced from each other in the transverse direction,
two lower surrounding protrusions respectively at the first lateral regions on the lower surface of the metal blank sheet, each of the lower surrounding protrusions extending to surround a respective one of the openings, and
two upper surrounding depressions respectively at the first lateral regions on the upper surface of the metal blank sheet, each of the upper surrounding depressions extending to surround a respective one of the openings; and
d) stamping the metal blank sheet to form
a plurality of rows of upper protrusions at the main region on the upper surface of the metal blank sheet, the rows of the upper protrusions being displaced from each other in the transverse direction such that two adjacent ones of the rows of the upper protrusions define in-between a corresponding one of the upper main channels, each of the rows of the upper protrusions including a plurality of the upper protrusions which are displaced from each other in the longitudinal direction,
a plurality of rows of lower depressions at the main region on the lower surface of the metal blank sheet, the rows of the lower depressions being displaced from each other in the transverse direction, each of the rows of the lower depressions including a plurality of the lower depressions which are displaced from each other in the longitudinal direction,
an upper surrounding protrusion on the upper surface of the metal blank sheet, the upper surrounding protrusion extending to surround the upper protrusions, the upper depressions, and the two upper surrounding depressions, and
a lower surrounding depression on the lower surface of the metal blank sheet, the lower surrounding depression extending to surround the lower protrusions, the lower depressions, and the two lower surrounding protrusions.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
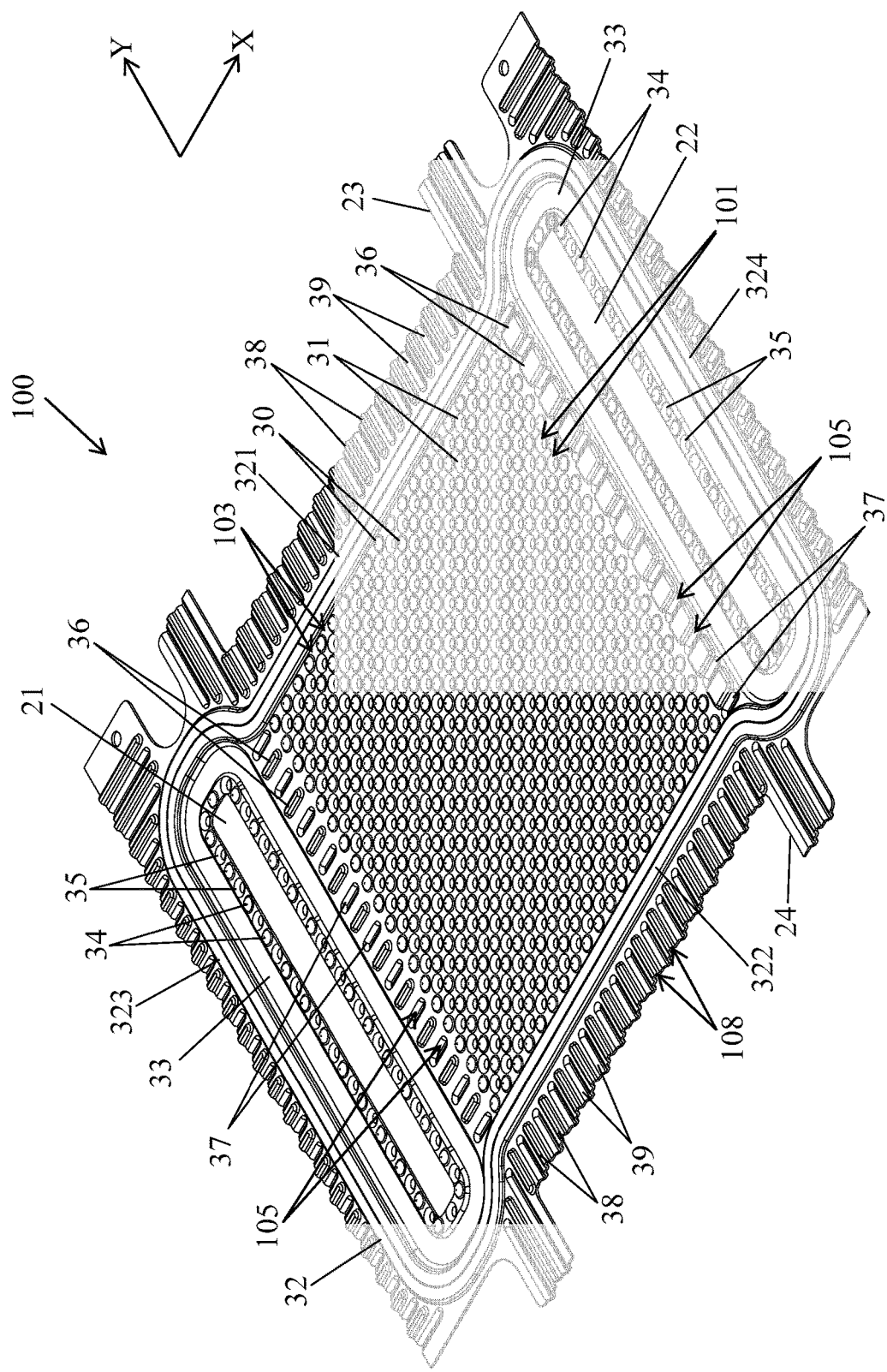
FIG. 1 is a perspective view of a modular planar interconnect plate according to an embodiment of the disclosure.

Before the disclosure is described in greater detail, it should be noted that where considered appropriate, reference numerals have been repeated among the figures to indicate corresponding or analogous elements, which may optionally have similar characteristics.

To aid in describing the disclosure, directional terms may be used in the specification and claims to describe portions of the present disclosure (e.g., front, rear, left, right, upper, etc.). These directional definitions are intended to merely assist in describing and claiming the disclosure and are not intended to limit the disclosure in any way.

Referring to FIGS. 1 to 6, a modular planar interconnect plate 100 according to an embodiment of the disclosure may be used for a solid oxide fuel cell, and is formed with a plurality of upper main channels 101 and a plurality of lower main channels 102. The upper main channels 101 extend in a longitudinal direction (X) and are displaced from each other in a transverse direction (Y) relative to the longitudinal direction (X). The lower main channels 102 extend in the transverse direction (Y) and are displaced from each other in the longitudinal direction (X).

A method for preparing the modular planar interconnect plate 100 according to an embodiment of the disclosure includes steps a) to d).

Figure 7:
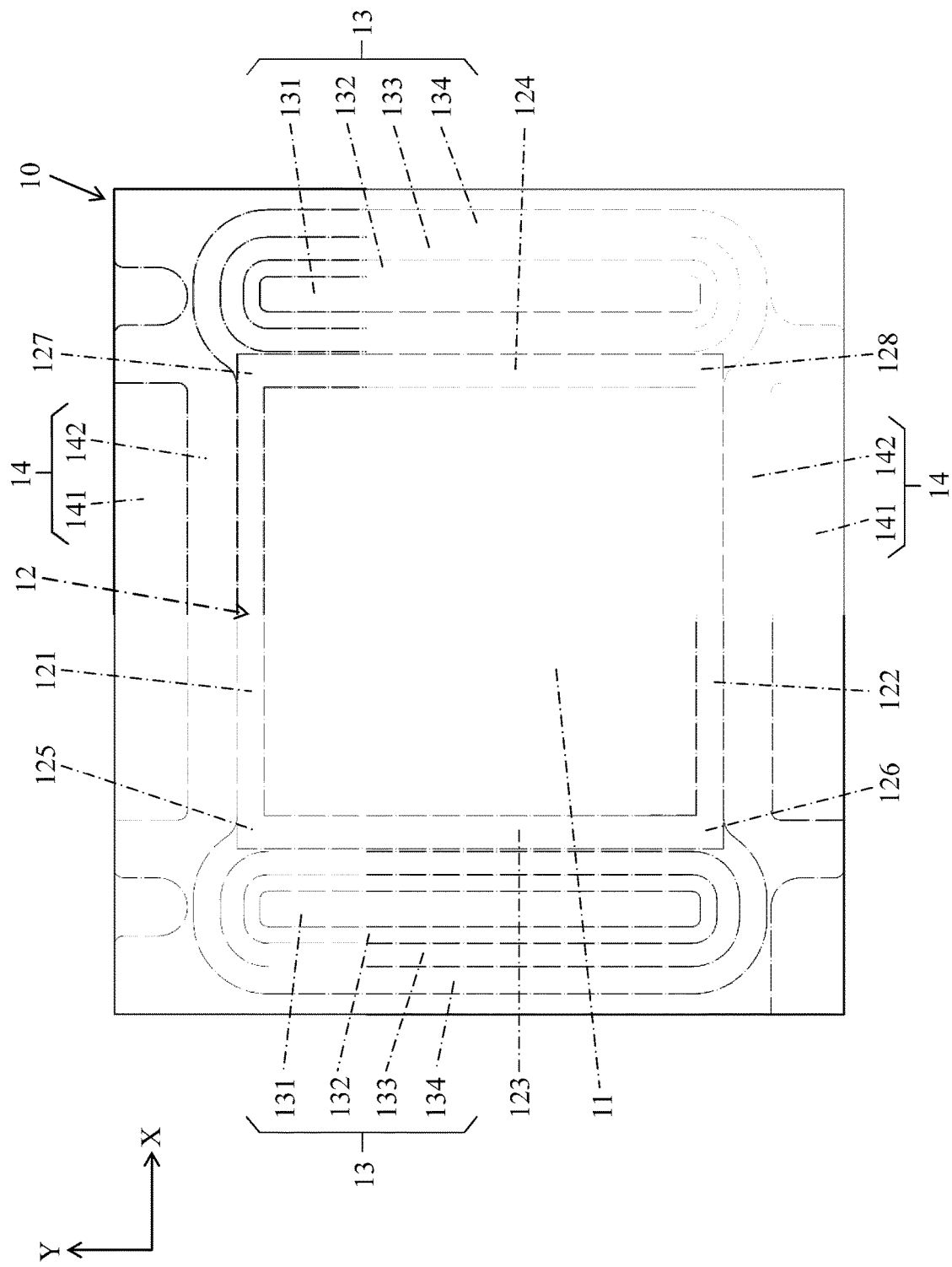
FIG. 7 is a perspective view of a metal blank sheet used in a method for preparing the modular planar interconnect plate according to an embodiment of the disclosure.

In step a), a metal blank sheet 10 as shown in FIG. 7 is provided. The metal blank sheet 10 has a main region 11, a circumferential region 12 which surrounds the main region 11, and two first lateral regions 13 which are spaced apart from each other in the longitudinal direction (X), and which are disposed respectively at left and right sides of the circumferential region 12.

In an embodiment, the metal blank sheet 10 may be made from a stainless steel material such as SUS 430, SUS 431, SUS 441, Crofer® 22, and the like.

In an embodiment illustrated in FIG. 7, the circumferential region 12 may include a front area 121, a rear area 122, a left area 123, and a right area 124. The rear area 122 is opposite to the front area 121 in the transverse direction (Y). The left area 123 defines a first juncture 125 with the front area 121, and defines a second juncture 126 with the rear area 122. The right area 124 is opposite to the left area 123 in the longitudinal direction (X), defines a third juncture 127 with the front area 121, and defines a fourth juncture 128 with the rear area 122.

In an embodiment shown in FIG. 7, each of the first lateral regions 13 may include an elongated central area 131 which is elongated in the transverse direction (Y), a first area 132 which surrounds the elongated central area 131, a second area 133 which surrounds the first area 132, and a third area 134 which extends from a respective one of the first and third junctures 125, 127, along an outer edge of the second area 133, to a respective one of the second and fourth junctures 126, 128.

In an embodiment shown in FIG. 7, the metal blank sheet 10 may further have two second lateral regions 14 which are spaced apart from each other in the transverse direction (Y), and which are respectively disposed at front and rear sides of the circumferential region 12. Each of the second lateral regions 14 may include a distal area 141 and a proximate area 142 relative to the circumferential region 12.

In step b), two openings 21, 22 are respectively formed in the first lateral regions 13. In an embodiment shown in FIGS. 1 to 3 and 7, in step b), each of the openings 21, 22 is formed in the elongated central area 131 of a respective one of the first lateral regions 13.

Figure 2:
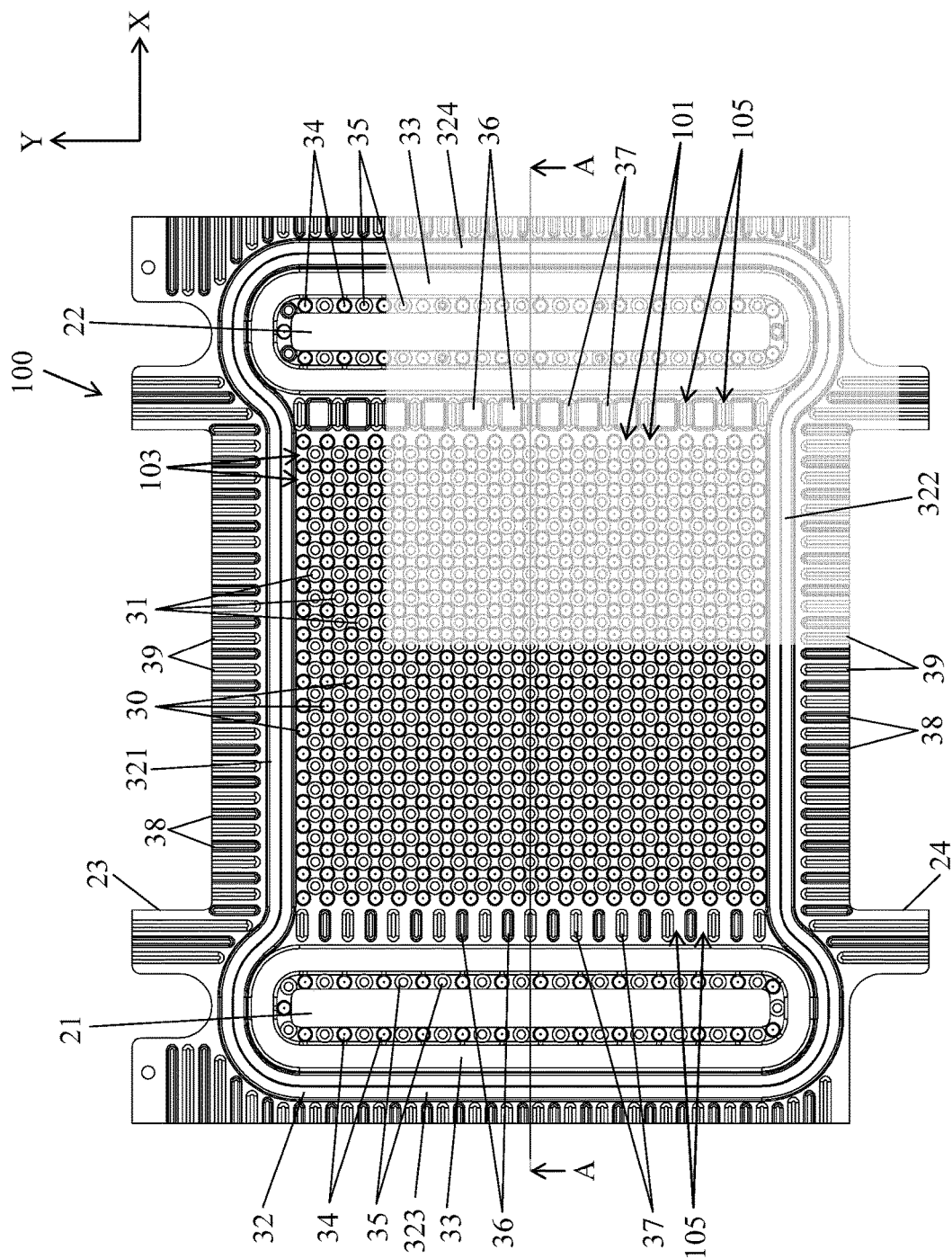
FIG. 2 is a top plane view of the modular planar interconnect plate.
Figure 3:
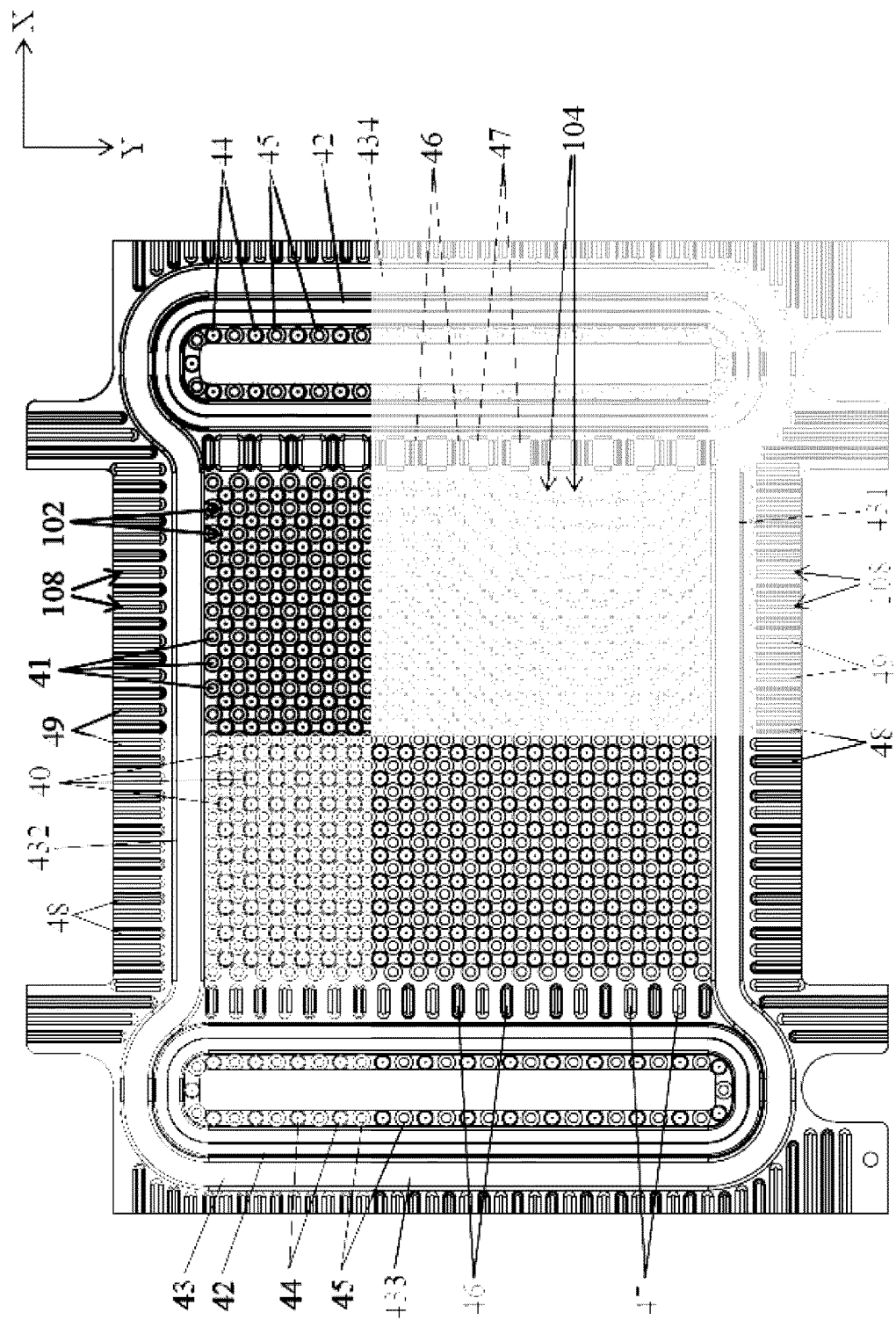
FIG. 3 is a bottom plane view of the modular planar interconnect plate.
Figure 4:
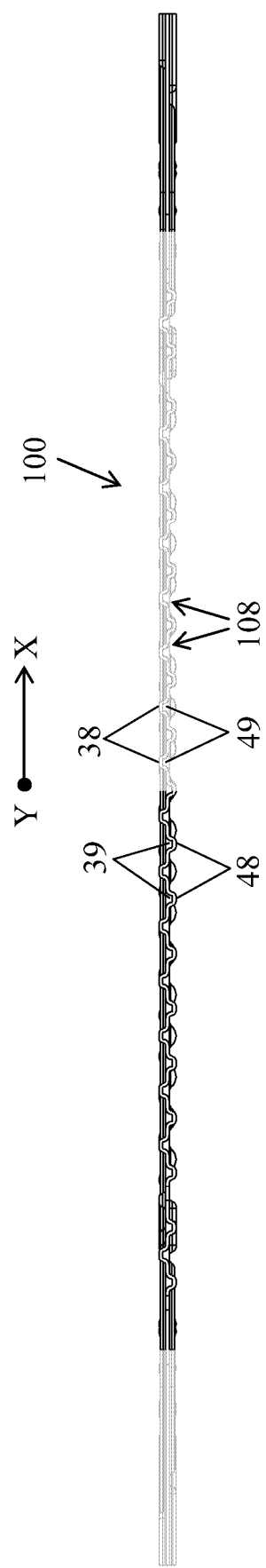
FIG. 4 is a lateral side view of the modular planar interconnect plate.
Figure 5:
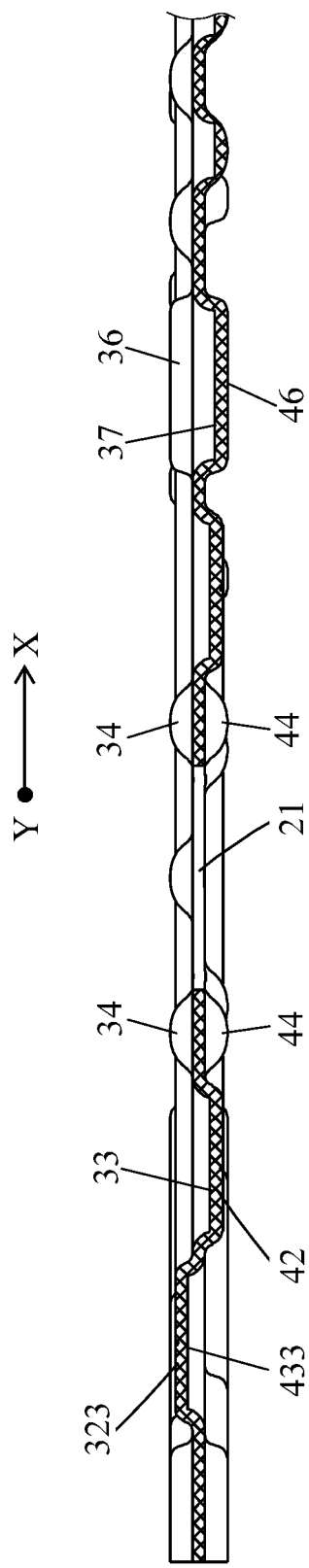
FIG. 5 is a fragmentary cross-sectional view taken along line A-A of FIG. 2, illustrating a left part of the modular planar interconnect plate.
Figure 6:
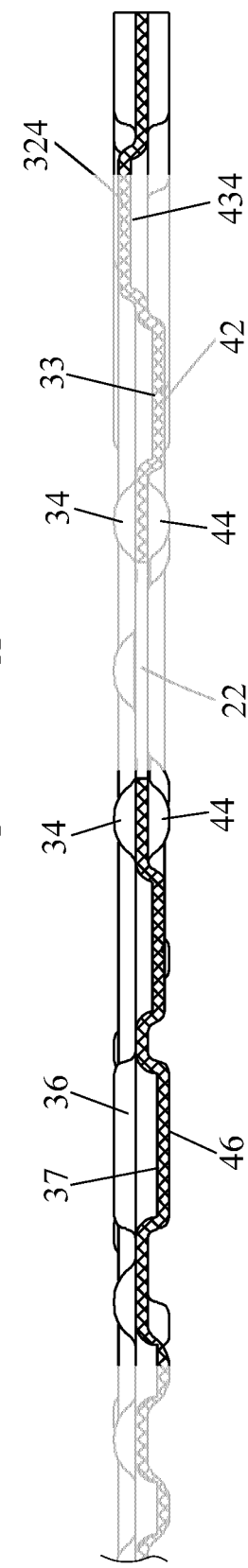
FIG. 6 is fragmentary cross-sectional view taken along line A-A of FIG. 2, illustrating a right part of the modular planar interconnect plate.

In step c), the metal blank sheet 10 is stamped downwardly to form a plurality of columns of lower protrusions 40, a plurality of columns of upper depressions 31, two lower surrounding protrusions 42, and two upper surrounding depressions 33 (see FIGS. 1 to 3).

The columns of the lower protrusions 40 are formed at the main region 11 on a lower surface of the metal blank sheet 10, and are displaced from each other in the longitudinal direction (X) such that two adjacent ones of the columns of the lower protrusions 40 define in-between a corresponding one of the lower main channels 102. Each of the columns of the lower protrusions 40 include a plurality of the lower protrusions 40 which are displaced from each other in the transverse direction (Y).

The columns of the upper depressions 31 are formed at the main region 11 on an upper surface of the metal blank sheet 10, and are displaced from each other in the longitudinal direction (X). Each of the columns of the upper depressions 31 include a plurality of the upper depressions 31 which are displaced from each other in the transverse direction (Y).

The lower surrounding protrusions 42 are formed respectively at the first lateral regions 13 on the lower surface of the metal blank sheet 10. Each of the lower surrounding protrusions 42 extends to surround a respective one of the openings 21, 22.

The upper surrounding depressions 33 are formed respectively at the first lateral regions 13 on the upper surface of the metal blank sheet 10. Each of the upper surrounding depressions 33 extends to surround a respective one of the openings 21, 22.

In an embodiment described with reference to FIGS. 1 to 3 and 7, in step c), each of the lower surrounding protrusions 42 is formed at the second area 133 of the respective first lateral region 13 on the lower surface of the metal blank sheet 10, and each of the upper surrounding depressions 33 is formed at the second area 133 of the respective first lateral region 13 on the upper surface of the metal blank sheet 10.

In step d), the metal blank sheet 10 is stamped upwardly to form a plurality of rows of upper protrusions 30, a plurality of rows of lower depressions 41, an upper surrounding protrusion 32, and a lower surrounding depression 43.

The rows of the upper protrusions 30 are formed at the main region 11 on the upper surface of the metal blank sheet 10, and are displaced from each other in the transverse direction (Y) such that two adjacent ones of the rows of the upper protrusions 30 define in-between a corresponding one of the upper main channels 101. Each of the rows of the upper protrusions 30 include a plurality of the upper protrusions 30 which are displaced from each other in the longitudinal direction (X).

The rows of the lower depressions 41 are formed at the main region 11 on the lower surface of the metal blank sheet 11, and are displaced from each other in the transverse direction (Y). Each of the rows of the lower depressions 41 include a plurality of the lower depressions 41 which are displaced from each other in the longitudinal direction (X).

The upper surrounding protrusion 32 is formed on the upper surface of the metal blank sheet 10, and extends to surround the upper protrusions 30, the upper depressions 31, and the two upper surrounding depressions 33. In an embodiment described with reference to FIGS. 1, 2, and 7, the upper surrounding protrusion 32 formed on the upper surface of the metal blank sheet 10 may include a first front portion 321 formed at the front area 121 of the circumferential region 12, a first rear portion 322 formed at the rear area 122 of the circumferential region 12, a first left portion 323 formed at the third area 134 of a left one of the first lateral regions 13, and a first right portion 324 formed at the third area 134 of a right one of the first lateral regions 13.

The lower surrounding depression 43 is formed on the lower surface of the metal blank sheet 10, and extends to surround the lower protrusions 40, the lower depressions 41, and the two lower surrounding protrusions 42. In an embodiment described with reference to FIGS. 3 and 7, the lower surrounding depression 43 formed on the lower surface of the metal blank sheet 10 may include a second front portion 431 formed at the front area 121 of the circumferential region 12, a second rear portion 432 formed at the rear area 122 of the circumferential region 12, a second left portion 433 formed at the third area 134 of the left one of the first lateral regions 13, and a second right portion 434 formed at the third area 134 of the right one of the first lateral regions 13.

In an embodiment described with reference to FIGS. 1 to 3 and 7, in step c), a plurality of lower additional protrusions 44 are formed at the first area 132 of each of the first lateral regions 13 on the lower surface of the metal blank sheet 10, and a plurality upper additional depressions 35 are formed at the first area 132 of each of the first lateral regions 13 on the upper surface of the metal blank sheet 10.

In an embodiment described with reference to FIGS. 1 to 3 and 7, in step d), a plurality of upper additional protrusions 34 are formed at the first area 132 of each of the first lateral regions 13 on the upper surface of the metal blank sheet 10 and are disposed to alternate with the upper additional depressions 35, and a plurality of lower additional depressions 45 are formed at the first area 132 of each of the first lateral regions 13 on the lower surface of the metal blank sheet and are disposed to alternate with the lower additional protrusions 44.

In an embodiment described with reference to FIGS. 1 to 3 and 7, in step c), a plurality of lower longitudinal protrusions 46, each extending in the longitudinal direction (X), are formed at each of the left and right areas 123, 124 of the circumferential region 12 on the lower surface of the metal blank sheet 10 and are displaced from one another in the transverse direction (Y), and a plurality of upper longitudinal depressions 37, each extending in the longitudinal direction (X), are formed at each of the left and right areas 123, 124 of the circumferential region 12 on the upper surface of the metal blank sheet 10 and are displaced from each other in the transverse direction (Y).

In an embodiment described with reference to FIGS. 1 to 3 and 7, in step d), a plurality of upper longitudinal protrusions 36, each extending in the longitudinal direction (X), are formed at each of the left and right areas 123, 124 of the circumferential region 12 on the upper surface of the metal blank sheet 10 and are disposed to alternate with the upper longitudinal depressions 37, and a plurality of lower longitudinal depressions 47, each extending in the longitudinal direction (X), are formed at each of the left and right areas 123, 124 of the circumferential region 12 on the lower surface of the metal blank sheet 10 and are disposed to alternate with the lower longitudinal protrusions 46. Two adjacent ones of the upper longitudinal protrusions 36 define in-between one of a plurality of upper routes 105 each extending in the longitudinal direction (X).

In an embodiment described with reference to FIGS. 1 to 3 and 7, the method may further include step e). In step e), two cutouts 23, 24 may be formed respectively in the distal areas 141 of the second lateral regions 14.

In an embodiment described with reference to FIGS. 1 to 4 and 7, in step c), a plurality of lower transverse protrusions 48, each being elongated in the transverse direction (Y), are formed at the proximate area 142 of each of the second lateral regions 14 on the lower surface of the metal blank sheet 10 and are displaced from each other in the longitudinal direction (X), and a plurality of upper transverse depressions 39, each being elongated in the transverse direction (Y), are formed at the proximate area 142 of each of the second lateral regions 14 on the upper surface of the metal blank sheet 10 and are displaced from each other in the longitudinal direction (X). Two adjacent ones of the lower transverse protrusions 48 define in-between one of a plurality of lower routes 108 each extending in the transverse direction (Y).

In an embodiment described with reference to FIGS. 1 to 4 and 7, in step d), a plurality of upper transverse protrusions 38, each being elongated in the transverse direction (Y), are formed at the proximate area 142 of each of the second lateral regions 14 on the upper surface of the metal blank sheet 10 and are disposed to alternate with the upper transverse depressions 39, and a plurality of lower transverse depressions 49, each being elongated in the transverse direction (Y), are formed at the proximate area 142 of each of the second lateral regions 14 on the lower surface of the metal blank sheet 10 and are disposed to alternate with the lower transverse protrusions 48.

With the provision of the upper transverse protrusions 38, the upper transverse depressions 39, the lower transverse protrusions 48, and the lower transverse depressions 49, the structure of the modular planar interconnect plate 100 may be further reinforced.

In an embodiment shown in FIGS. 1 and 2, each of the upper protrusions 30 of one of the rows of the upper protrusions 30 is of the same dimension as and aligned with corresponding ones of the upper protrusions 30 of the remaining rows of the upper protrusions 30 so as to forma plurality of the columns of the upper protrusions 30 at the main region 11 on the upper surface of the metal blank sheet 10. The columns of the upper protrusions 30 are displaced from one another in the longitudinal direction (X) such that two adjacent ones of the columns of the upper protrusions 30 define in-between one of a plurality of upper auxiliary channels 103 transverse to the upper main channels 101.

In an embodiment shown in FIGS. 1 and 2, the upper depressions 31 of each of the columns of the upper depressions 31 are staggered with the upper protrusions 30 of an adjacent one of the columns of the upper protrusions 30 so as to permit both steps (c) and (d) to be implemented simultaneously.

In an embodiment shown in FIG. 3, each of the lower protrusions 40 of one of the columns of the lower protrusions 40 is of the same dimension as and aligned with corresponding ones of the lower protrusions 40 of the remaining columns of the lower protrusions 40 so as to form a plurality of rows of the lower protrusions 40 at the main region 11 on the lower surface of the metal blank sheet 10. The rows of the lower protrusions 40 are displaced from one another in the transverse direction (Y) such that two adjacent ones of the rows of the lower protrusions 40 define in-between one of a plurality of lower auxiliary channels 104 transverse to the lower main channels 102.

In an embodiment shown in FIG. 3, the lower depressions 41 of each of the rows of the lower depressions 41 are staggered with the lower protrusions 40 of an adjacent one of the rows of the lower protrusions 40 so as to permit both steps (c) and (d) to be implemented simultaneously.

Figure 8:
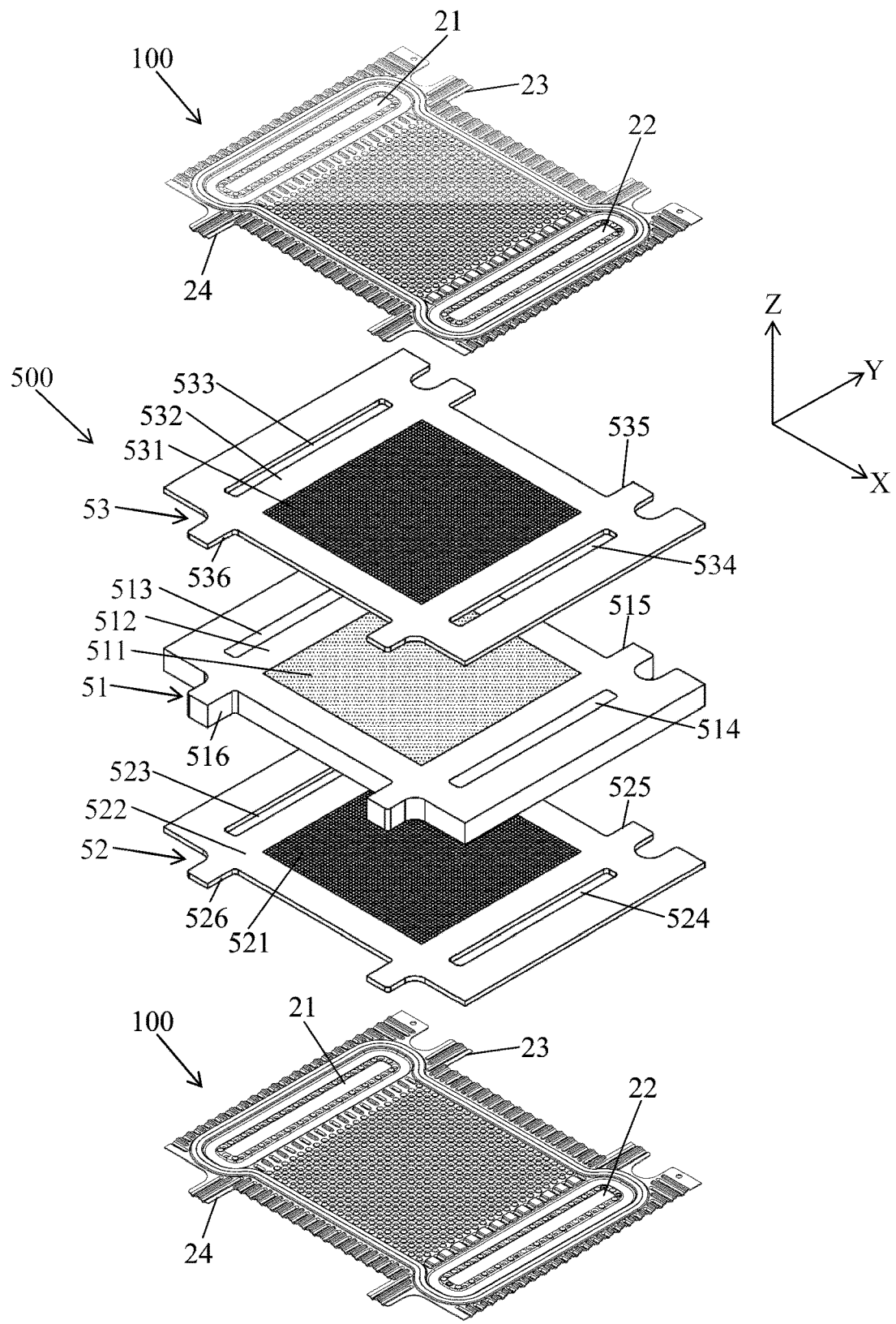
FIG. 8 is a perspective exploded view of a portion of a solid oxide fuel cell in which a planar cell unit is sandwiched between two of the modular planar interconnect plates.

FIG. 8 illustrates a portion of a solid oxide fuel cell. The solid oxide fuel cell may include a plurality of the modular planar interconnect plates 100 (only two are shown) and a plurality of planar cell units 500 (only one is shown). The modular planar interconnect plates 100 are displaced from each other in an upright direction (Z), and the planar cell units 500 are disposed to alternate with the modular planar interconnect plates 100. Each of the planar cell units 500 may include a planar cell member 51, an anode member 52, and a cathode member 53.

The planar cell member 51 may include a planar cell body 511 which serves as an electrolyte, and a cell-body support frame 512 which is disposed to surround and support the planar cell body 511 and which has two openings 513, 514, and two cutouts 515, 516.

The anode member 52 may include an anode web 521 and an anode frame 522 which is disposed to surround and support the anode web 521, and which has two openings 523, 524 and two cutouts 525, 526.

The cathode member 53 may include a cathode web 531 and a cathode frame 532 which is disposed to surround and support the cathode web 531, and which has two openings 533, 534 and two cutouts 535, 536.

When the modular planar interconnect plates 100 and the planar cell units 500 are assembled into the solid oxide fuel cell, (i) the openings 21, 513, 523, 533 are in register with one another to form a first inlet passage for a fuel fluid, (ii) the openings 22, 514, 524, 534 are in register with one another to form a first outlet passage for the fuel fluid, (iii) the cutouts 23, 515, 525, 535 are in register with one another to form a second inlet passage for an oxygen-containing fluid, and (iv) the cutouts 24, 516, 526, 536 are in register with one another to form a second outlet passage for the oxygen-containing fluid. The fuel fluid may contain hydrogen, alcohol, methane, natural gas, or the like.

In addition, a first sealing material (not shown) may be provided between the upper surrounding protrusion 32 of each of the modular planar interconnect plates 100 and the anode frame 522 of an adjacent one of the planar cell units 500. A second sealing material (not shown) may be provided between each of the lower surrounding protrusions 42 of each of the modular planar interconnect plates 100 and the cathode frame 532 of an adjacent one of the planar cell units 500. With the provision of the first and second sealing materials, the fuel fluid may be prevented from leaking out from junctions among the modular planar interconnect plates 100 and the planar cell units 500.

In operation, with reference to FIGS. 1, 2, and 8, the fuel fluid in the first inlet passage may flow into the upper main channels 101 and the upper auxiliary channels 103 through left ones of the upper routes 105 so as to permit access of the fuel fluid to the anode web 521. The excess of the fuel fluid may be discharged to the first outlet passage through right ones of the upper routes 105. The right ones of the upper routes 105 may each have a smaller dimension than each of the left ones of the upper routes 105 so as to ensure the fuel fluid even distribution among the upper main channels 101 and the upper auxiliary channels 103. In other unshown embodiments, each of the left ones of the upper routes 105 may have a substantially the same dimension as that of each of the right ones of the upper routes 105.

In the meantime, with reference to FIGS. 3 and 8, the oxygen-containing fluid may flow into the lower main channels 102 and the lower auxiliary channels 104 through front ones of the lower routes 108 so as to permit access of the oxygen-containing fluid to the cathode web 531. The excess of the oxygen-containing fluid may be discharged to the second outlet passage through rear ones of the lower routes 108.

In sum, the method for preparing the modular planar interconnect plate is a relatively simple and rapid method, and the fuel fluid is less likely to leak out from the solid oxide fuel cell provided with a plurality of the modular planar interconnect plates.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for preparing a modular planar interconnect plate for a solid oxide fuel cell and formed with a plurality of upper main channels which extend in a longitudinal direction and which are displaced from each other in a transverse direction relative to the longitudinal direction, and a plurality of lower main channels which extend in the transverse direction and which are displaced from each other in the longitudinal direction, the method comprising the steps of:
  a) providing a metal blank sheet having
     a main region,
     a circumferential region surrounding the main region, and
     two first lateral regions spaced apart from each other in the longitudinal direction, and disposed respectively at left and right sides of the circumferential region;
  b) forming two openings respectively in the first lateral regions;
  c) stamping the metal blank sheet to form
     a plurality of columns of lower protrusions at the main region on a lower surface of the metal blank sheet, the columns of the lower protrusions being displaced from each other in the longitudinal direction such that two adjacent ones of the columns of the lower protrusions define in-between a corresponding one of the lower main channels, each of the columns of the lower protrusions including a plurality of the lower protrusions which are displaced from each other in the transverse direction, a plurality of columns of upper depressions at the main region on an upper surface of the metal blank sheet, the columns of the upper depressions being displaced from each other in the longitudinal direction, each of the columns of the upper depressions including a plurality of the upper depressions which are displaced from each other in the transverse direction, two lower surrounding protrusions respectively at the first lateral regions on the lower surface of the metal blank sheet, each of the lower surrounding protrusions extending to surround a respective one of the openings, and two upper surrounding depressions respectively at the first lateral regions on the upper surface of the metal blank sheet, each of the upper surrounding depressions extending to surround a respective one of the openings; and d) stamping the metal blank sheet to form a plurality of rows of upper protrusions at the main region on the upper surface of the metal blank sheet, the rows of the upper protrusions being displaced from each other in the transverse direction such that two adjacent ones of the rows of the upper protrusions define in-between a corresponding one of the upper main channels, each of the rows of the upper protrusions including a plurality of the upper protrusions which are displaced from each other in the longitudinal direction, a plurality of rows of lower depressions at the main region on the lower surface of the metal blank sheet, the rows of the lower depressions being displaced from each other in the transverse direction, each of the rows of the lower depressions including a plurality of the lower depressions which are displaced from each other in the longitudinal direction, an upper surrounding protrusion on the upper surface of the metal blank sheet, the upper surrounding protrusion extending to surround the upper protrusions, the upper depressions, and the two upper surrounding depressions, and a lower surrounding depression on the lower surface of the metal blank sheet, the lower surrounding depression extending to surround the lower protrusions, the lower depressions, and the two lower surrounding protrusions, wherein the circumferential region includes
a front area,
a rear area opposite to the front area in the transverse direction,
a left area defining a first juncture with the front area, and defining a second juncture with the rear area, and
a right area opposite to the left area in the longitudinal direction, the right area defining a third juncture with the front area and defining a fourth juncture with the rear area;

wherein each of the first lateral regions includes an elongated central area which is elongated in the transverse direction, a first area which surrounds the elongated central area, a second area which surrounds the first area, and a third area which extends from a respective one of the first and third junctures, along an outer edge of the second area, to a respective one of the second and fourth junctures;

wherein, in step b), each of the openings is formed in the elongated central area of a respective one of the first lateral regions;

wherein, in step c), each of the lower surrounding protrusions is formed at the second area of the respective first lateral region on the lower surface of the metal blank sheet, and each of the upper surrounding depressions is formed at the second area of the respective first lateral region on the upper surface of the metal blank sheet;

wherein the upper surrounding protrusion formed on the upper surface of the metal blank sheet includes
a first front portion formed at the front area of the circumferential region,
a first rear portion formed at the rear area of the circumferential region,
a first left portion formed at the third area of a left one of the first lateral regions, and
a first right portion formed at the third area of a right one of the first lateral regions;

wherein the lower surrounding depression formed on the lower surface of the metal blank sheet includes
a second front portion formed at the front area of the circumferential region,
a second rear portion formed at the rear area of the circumferential region,
a second left portion formed at the third area of the left one of the first lateral regions, and
a second right portion formed at the third area of the right one of the first lateral regions;

wherein, in step c), a plurality of lower longitudinal protrusions, each extending in the longitudinal direction, are formed at each of the left and right areas of the circumferential region on the lower surface of the metal blank sheet and are displaced from each other in the transverse direction, and a plurality of upper longitudinal depressions, each extending in the longitudinal direction, are formed at each of the left and right areas of the circumferential region on the upper surface of the metal blank sheet and are displaced from each other in the transverse direction; and wherein, in step d), a plurality of upper longitudinal protrusions, each extending in the longitudinal direction, are formed at each of the left and right areas of the circumferential region on the upper surface of the metal blank sheet and are disposed to alternate with the upper longitudinal depressions, and a plurality of lower longitudinal depressions, each extending in the longitudinal direction, are formed at each of the left and right areas of the circumferential region on the lower surface of the metal blank sheet and are disposed to alternate with the lower longitudinal protrusions, two adjacent ones of the upper longitudinal protrusions defining in-between one of a plurality of upper routes each extending in the longitudinal direction.

2. The method according to claim 1,
wherein, in step c), a plurality of lower additional protrusions are formed at the first area of each of the first lateral regions on the lower surface of the metal blank sheet, and a plurality upper additional depressions are formed at the first area of each of the first lateral regions on the upper surface of the metal blank sheet; and
wherein, in step d), a plurality of upper additional protrusions are formed at the first area of each of the first lateral regions on the upper surface of the metal blank sheet and are disposed to alternate with the upper additional depressions, and a plurality of lower additional depressions are formed at the first area of each of the first lateral regions on the lower surface of the metal blank sheet and are disposed to alternate with the lower additional protrusions.

3. The method according to claim 1, wherein each of the upper protrusions of one of the rows of the upper protrusions is of the same dimension as and aligned with corresponding ones of the upper protrusions of the remaining rows of the upper protrusions so as to form a plurality of columns of the upper protrusions at the main region on the upper surface of the metal blank sheet, the columns of the upper protrusions being displaced from each other in the longitudinal direction such that two adjacent ones of the columns of the upper protrusions define in-between one of a plurality of upper auxiliary channels transverse to the upper main channels.

4. The method according to claim 3, wherein the upper depressions of each of the columns of the upper depressions are staggered with the upper protrusions of an adjacent one of the columns of the upper protrusions so as to permit both steps (c) and (d) to be implemented simultaneously.

5. The method according to claim 1, wherein each of the lower protrusions of one of the columns of the lower protrusions is of the same dimension as and aligned with corresponding ones of the lower protrusions of the remaining columns of the lower protrusions so as to form a plurality of rows of the lower protrusions at the main region on the lower surface of the metal blank sheet, the rows of the lower protrusions being displaced from each other in the transverse direction such that two adjacent ones of the rows of the lower protrusions define in-between one of a plurality of lower auxiliary channels transverse to the lower main channels.

6. The method according to claim 5, wherein the lower depressions of each of the rows of the lower depressions are staggered with the lower protrusions of an adjacent one of the rows of the lower protrusions so as to permit both steps (c) and (d) to be implemented simultaneously.

7. A method for preparing a modular planar interconnect plate for a solid oxide fuel cell and formed with a plurality of upper main channels which extend in a longitudinal direction and which are displaced from each other in a transverse direction relative to the longitudinal direction, and a plurality of lower main channels which extend in the transverse direction and which are displaced from each other in the longitudinal direction, the method comprising the steps of:

a) providing a metal blank sheet having
  a main region,
  a circumferential region surrounding the main region, and
  two first lateral regions spaced apart from each other in the longitudinal direction, and disposed respectively at left and right sides of the circumferential region;

b) forming two openings respectively in the first lateral regions;

c) stamping the metal blank sheet to form
  a plurality of columns of lower protrusions at the main region on a lower surface of the metal blank sheet, the columns of the lower protrusions being displaced from each other in the longitudinal direction such that two adjacent ones of the columns of the lower protrusions define in-between a corresponding one of the lower main channels, each of the columns of the lower protrusions including a plurality of the lower protrusions which are displaced from each other in the transverse direction,
  a plurality of columns of upper depressions at the main region on an upper surface of the metal blank sheet, the columns of the upper depressions being displaced from each other in the longitudinal direction, each of the columns of the upper depressions including a plurality of the upper depressions which are displaced from each other in the transverse direction,
  two lower surrounding protrusions respectively at the first lateral regions on the lower surface of the metal blank sheet, each of the lower surrounding protrusions extending to surround a respective one of the openings, and
  two upper surrounding depressions respectively at the first lateral regions on the upper surface of the metal blank sheet, each of the upper surrounding depressions extending to surround a respective one of the openings; and d) stamping the metal blank sheet to form
  a plurality of rows of upper protrusions at the main region on the upper surface of the metal blank sheet, the rows of the upper protrusions being displaced from each other in the transverse direction such that two adjacent ones of the rows of the upper protrusions define in-between a corresponding one of the upper main channels, each of the rows of the upper protrusions including a plurality of the upper protrusions which are displaced from each other in the longitudinal direction,
  a plurality of rows of lower depressions at the main region on the lower surface of the metal blank sheet, the rows of the lower depressions being displaced from each other in the transverse direction, each of the rows of the lower depressions including a plurality of the lower depressions which are displaced from each other in the longitudinal direction,
  an upper surrounding protrusion on the upper surface of the metal blank sheet, the upper surrounding protrusion extending to surround the upper protrusions, the upper depressions, and the two upper surrounding depressions, and
  a lower surrounding depression on the lower surface of the metal blank sheet, the lower surrounding depression extending to surround the lower protrusions, the lower depressions, and the two lower surrounding protrusions, wherein the metal blank sheet further has two second lateral regions which are spaced apart from each other in the transverse direction, and which are respectively disposed at front and rear sides of the circumferential region, each of the second lateral regions including a distal area and a proximate area relative to the circumferential region;

wherein the method further comprises a step e) of forming two cutouts respectively in the distal areas of the second lateral regions;

wherein, in step c), a plurality of lower transverse protrusions, each being elongated in the transverse direction, are formed at the proximate area of each of the second lateral regions on the lower surface of the metal blank sheet and are displaced from each other in the longitudinal direction, and a plurality of upper transverse depressions, each being elongated in the transverse direction, are formed at the proximate area of each of the second lateral regions on the upper surface of the metal blank sheet and are displaced from each other in the longitudinal direction, two adjacent ones of the lower transverse protrusions defining in-between one of a plurality of lower routes each extending in the transverse direction; and wherein, in step d), a plurality of upper transverse protrusions, each being elongated in the transverse direction, are formed at the proximate area of each of the second lateral regions on the upper surface of the metal blank sheet and are disposed to alternate with the upper transverse depressions, and a plurality of lower transverse depressions, each being elongated in the transverse direction, are formed at the proximate area of each of the second lateral regions on the lower surface of the metal blank sheet and are disposed to alternate with the lower transverse protrusions.

8. The method according to claim 7, wherein, in step c), a plurality of lower additional protrusions are formed at the first area of each of the first lateral regions on the lower surface of the metal blank sheet, and a plurality upper additional depressions are formed at the first area of each of the first lateral regions on the upper surface of the metal blank sheet; and wherein, in step d), a plurality of upper additional protrusions are formed at the first area of each of the first lateral regions on the upper surface of the metal blank sheet and are disposed to alternate with the upper additional depressions, and a plurality of lower additional depressions are formed at the first area of each of the first lateral regions on the lower surface of the metal blank sheet and are disposed to alternate with the lower additional protrusions.

9. The method according to claim 7, wherein each of the upper protrusions of one of the rows of the upper protrusions is of the same dimension as and aligned with corresponding ones of the upper protrusions of the remaining rows of the upper protrusions so as to form a plurality of columns of the upper protrusions at the main region on the upper surface of the metal blank sheet, the columns of the upper protrusions being displaced from each other in the longitudinal direction such that two adjacent ones of the columns of the upper protrusions define in-between one of a plurality of upper auxiliary channels transverse to the upper main channels.

10. The method according to claim 9, wherein the upper depressions of each of the columns of the upper depressions are staggered with the upper protrusions of an adjacent one of the columns of the upper protrusions so as to permit both steps (c) and (d) to be implemented simultaneously.

11. The method according to claim 7, wherein each of the lower protrusions of one of the columns of the lower protrusions is of the same dimension as and aligned with corresponding ones of the lower protrusions of the remaining columns of the lower protrusions so as to form a plurality of rows of the lower protrusions at the main region on the lower surface of the metal blank sheet, the rows of the lower protrusions being displaced from each other in the transverse direction such that two adjacent ones of the rows of the lower protrusions define in-between one of a plurality of lower auxiliary channels transverse to the lower main channels.

12. The method according to claim 11, wherein the lower depressions of each of the rows of the lower depressions are staggered with the lower protrusions of an adjacent one of the rows of the lower protrusions so as to permit both steps (c) and (d) to be implemented simultaneously.

* * * * *